United States Patent [19]

Wernli

[11] 4,163,818

[45] Aug. 7, 1979

[54] ANTI-SLIP SERVING TRAY AND THE METHOD OF MANUFACTURING THEREOF

[76] Inventor: Pierre Wernli, Turmweg 3, 2560 Nidau, Switzerland

[21] Appl. No.: 877,966

[22] Filed: Feb. 15, 1978

[51] Int. Cl.$^2$ .................. B29D 9/00; B29C 27/14
[52] U.S. Cl. .................. 428/138; 156/224; 156/331; 156/335; 264/137; 264/248; 264/257; 428/247; 428/530; 428/531
[58] Field of Search .......... 264/DIG. 57, 59, 250, 264/255, 257, 258, 336, 137, 248; 156/87, 323, 331, 335, 224; 428/131, 137, 502, 526, 531, 534, 535, 540, 138

[56] References Cited

U.S. PATENT DOCUMENTS

| | | | |
|---|---|---|---|
| 1,912,931 | 6/1933 | Clay | 264/258 |
| 1,957,732 | 5/1934 | Rowe | 156/87 |
| 2,042,210 | 5/1936 | Clay | 264/258 |
| 2,300,760 | 11/1942 | Amigo | 264/258 |
| 2,379,248 | 6/1945 | Muskat | 264/DIG. 59 |
| 2,463,856 | 3/1949 | Dickerman | 156/335 |
| 2,534,923 | 12/1950 | Nagel | 156/224 |
| 2,694,028 | 11/1954 | Rapp | 428/503 |
| 2,739,081 | 3/1956 | Wohnsiedler et al. | 428/503 |
| 3,067,077 | 12/1962 | Latella | 428/503 |
| 3,185,371 | 5/1965 | Reifers | 229/2.5 |
| 3,464,884 | 9/1969 | Boenig et al. | 428/526 |
| 3,551,270 | 12/1970 | Sharkey | 156/87 |
| 3,949,133 | 4/1976 | Santurri et al. | 428/531 |

*Primary Examiner*—W. E. Hoag
*Attorney, Agent, or Firm*—Robert E. Burns; Emmanuel J. Lobato; Bruce L. Adams

[57] ABSTRACT

An anti-slip tray and the method of manufacturing it. Sheets of paper impregnated with melamine resin and paper sheets impregnated with phenolic resin are stacked in a pile. A loosely woven cloth covers the pile. Its upper face or major surface is covered with a layer of porous PVC which can be decorative. The cloth has a plurality of perforations. The cloth and pile are molded under heat and pressure.

3 Claims, No Drawings

ANTI-SLIP SERVING TRAY AND THE METHOD OF MANUFACTURING THEREOF

BACKGROUND OF THE INVENTION

The invention relates to serving trays with an anti-slip surface.

A known method of manufacturing an anti-slip serving tray comprises providing a pile of sheets of paper impregnated with thermo-hardenable materials, such as melamines or phenolic resins. On this pile is placed a flexible cloth covered at least on its upper face by a layer of thermoplastic material such as PVC. The assembly is then pressed in a mould with the application of heat to transform protruding parts of said layer into synthetic rubber by polymerization, and to harden the stratified assembly.

Trays produced in this manner are rigid, light, have good mechanical strength and resistance to chemicals and, above all, have excellent anti-slip properties.

However, the method has an important drawback. During moulding, the resin-impregnated inner sheets give off gases and vapours that cannot completely escape through the albeit-porous PVC or other covering layer, and form bubbles trapped under said layer or its supporting cloth. When the tray is removed from the mould, these bubbles form superficial inequalities in the surface, which are perceptible and spoil the appearance of the tray.

An aim of the invention is to avoid this drawback in the above-mentioned method.

SUMMARY OF THE INVENTION

According to the invention, a method of manufacturing an anti-slip tray, as set out above, comprises employing a covering layer and its supporting cloth which are provided with perforations, these perforations favourizing the escape of the gases and vapours given off during moulding.

There may, for example, be from 5 to 10 perforations per square centimeter of the covering layer and its cloth support, the perforations having a diameter of from 0.1 to 0.2 mm.

The invention also concerns the serving tray obtained.

An examination of a tray obtained by the method according to the invention shows that the perforations, after having served for the removal of gases and vapours, disappear at the end of the moulding operation under the effect of the heat and pressure applied.

DESCRIPTION OF THE PREFERRED EMBODIMENT

An example of carrying out the method according to the invention comprises the following steps:

(a) A pile is made successively (from bottom to top) of sheets of paper impregnated with melamine resins, and sheets of paper impregnated with phenolic resins. The latter sheets have a greater density of impregnated resins than the former.

(b) On this pile is placed a loosely-woven cloth covered on its upper face with a layer of porous PVC, possibly decorated, for example having the aspect of wood grains. The cloth with its covering PVC layer is previously perforated with 8 to 10 perforations of 0.1 to 0.2 mm diameter per square centimeter.

(c) This assembly is placed in a mould, and pressed with the application of heat by means of a punch, at a temperature of about 140° C. and a pressure of about 60 kg/cm$^2$ for about ten minutes.

(d) The tray is removed from the mould and allowed to cool. The anti-slip surface of the tray has no bubbles or irregularities.

In another manner of carrying out the method, the moulding is carried out in two steps, as follows:

(a) A first part of the sheets impregnated with resin is pressed with a protective covering sheet, for example a sheet of parchment paper, to prevent the resin from sticking to the punch of the press.

(b) The punch is lifted up and the protective sheet removed.

(c) The remainder of sheets impregnated with resin, covered by the perforated cloth/PVC layer, is placed in the mould on the previously-pressed sheets.

(d) Final moulding is carried out.

What I claim is:

1. A method of manufacturing an anti-slip laminate suitable for making a tray, comprising:
   stacking sheets of paper impregnated with melamine sheets alternately with sheets of paper impregnated with phenolic resins, the last mentioned sheets having a greater density of impregnated resins than the first-mentioned sheets, placing on the stack a loosely woven cloth covered on its upper face with a layer of porous PVC, said cloth having from eight to ten perforations per square centimeter, the perforations having a diameter of 0.1 to 0.2 mm. pressing the stack in a tray mold with said cloth thereon under a temperature of about 140° C. and at a pressure of about 60 kg./cm.$^2$ for about ten minutes, and removing a molded laminate from said mold.

2. A method according to claim 1, in which said upper face of said cloth is decorative.

3. An antislip laminate suitable for making a tray, said laminate being made according to the method of claim 1.

* * * * *